United States Patent [19]

Christenson

[11] 4,124,483
[45] Nov. 7, 1978

[54] APPARATUS AND METHOD OF ASSISTING PILE DRIVING BY ELECTRO-OSMOSIS

[76] Inventor: Lowell B. Christenson, 7410 Thurow, Houston, Tex. 77087

[21] Appl. No.: 841,621

[22] Filed: Oct. 13, 1977

[51] Int. Cl.² .................. B01D 13/02; E02D 7/26
[52] U.S. Cl. .................. 204/299 R; 204/180 R; 204/300 R; 405/232; 405/258; 166/248; 175/19
[58] Field of Search .................. 204/180 R, 299, 300; 61/36 R, 53.5; 166/248; 175/19

[56] References Cited
U.S. PATENT DOCUMENTS 4,046,657  9/1977  Abbott .......................... 204/180 R

OTHER PUBLICATIONS

Nikolaev, "Pile Driving By Electro-Osmosis", Consultants Bureau, 1962.
Wang, "Stresses in a Saturated Soil Mass During Electro-Osmosis", Consultants Bureau.
Begeman, "The Influence of D.C. Potential on Adhesion Between Clay and Metal Objects . . . Tests", Consultants Bureau.

Primary Examiner—Arthur C. Prescott
Attorney, Agent, or Firm—Fulbright & Jaworski

[57] ABSTRACT

An apparatus and method for assisting the driving of an electrically conductive pile into soil containing water by electro-osmosis in which electrical direct current is directed through the soil for reducing friction between the pile and the soil. The outside of the pile is coated with a dielectric coating but the lower end of the pile is uncoated for providing an electrical cathode at the lower end. The negative output of a d-c power source is connected to the conductive pile thereby placing the electrical cathode at a negative potential. The positive output of the d-c power source is connected to an anode which is positioned in the water causing the water to move from the anode to the cathode through the soil making the pile easier to drive into the soil. Preferably, the width of the uncoated cathode is approximately equal to the width of the pile. In the case of assisting the driving of an electrically conductive hollow pile, a dielectric coating is provided on both the inside and outside of the pile but with the lower end of the pile being uncoated for providing an electrical cathode at the lower end. The negative output of a d-c power source is connected to the conductive pile, a first electrode is positioned outside of the pile and in the water and connected to the positive output of the d-c power source, and a second anode is positioned inside of the hollow pile in the water and connected to the positive output of the power source.

11 Claims, 4 Drawing Figures

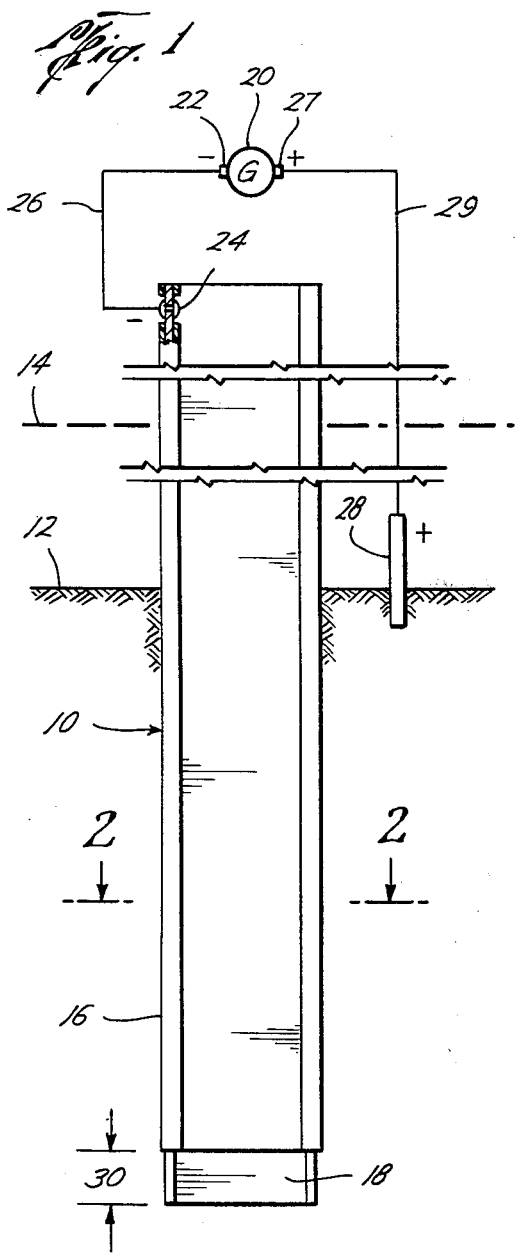
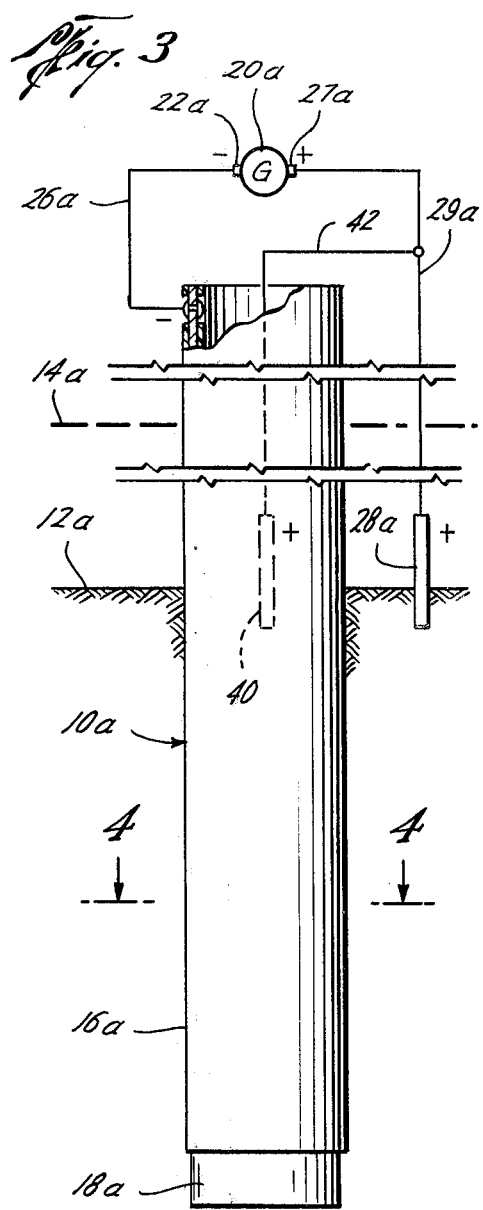
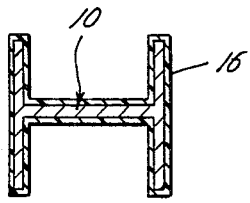
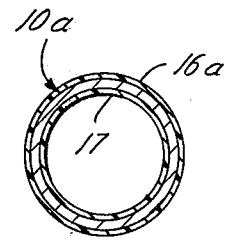

APPARATUS AND METHOD OF ASSISTING PILE DRIVING BY ELECTRO-OSMOSIS

BACKGROUND OF THE INVENTION

The principle of electro-osmosis is used in the field of soil mechanics to describe the effect of water moving through a non-granular soil from an anode to a cathode upon the application of a direct current power source. Electro-osmosis also has been used to assist pile driving as described in U.S. Pat. No. 4,046,657, my copending patent application Ser. No. 761,737, and as described in the following prior art papers:

1. Pile Driving by Electro-osmosis, by B. A. Nikolaev, Consultants Bureau, 1962;
2. Stresses in Saturated Soil Mass During Electro-Osmosis, by W. S. Wang; and
3. The influence of a Direct Current Potential on the Adhesion Between Clay and Metal Objects. Laboratory and full Scale Tests, by Ir. H.K.S. ph. Begemann.

The present invention is directed to an improved method and apparatus for assisting pile driving by electro-osmosis by directing positive current downwardly through the soil towards the lower end of the pile to move water through the soil whereby the pile can be more easily driven. In particular, the present invention provides a method and apparatus for increasing the effect of electro-osmosis in driving a conductive pile whereby the friction between the pile and the soil is reduced and the pile may be more easily and inexpensively driven into the soil.

SUMMARY

The present invention is directed to an apparatus and method of assisting the driving of an electrically conductive pile into soil containing water by coating the outside of the pile with a dielectric coating but leaving the lower end of the pile uncoated for providing an electrical cathode at the lower end and connecting the negative output of a d-c power source to the conductive pile whereby the electrical cathode at the lower end becomes negative. An anode is positioned outside of the pile and in the water and connected to the positive output of the d-c power source whereby the passage of electricity from the anode to the cathode reduces friction between the pile and the soil.

A still further object of the present invention is providing an uncoated electrical cathode at the lower end of the pile which has a width of approximately equal to the width of the pile.

Still a further object of the present invention is the provision of an apparatus and method for assisting the driving of an electrically conductive hollow pile in which a dielectric coating is provided on both the inside and outside of the pile but the lower end of the pile is left uncoated for creating an electric cathode at the lower end of the pile. The conductive pile is connected to the negative output of a d-c power source whereby the cathode has a negative potential. A first anode is positioned outside of the pile and in the water and connected to the positive output of the power source and a second anode is positioned inside of the hollow pile and in the water and connected to the positive output of the power source whereby electrical current flows from the anodes down both the inside and outside of the pile towards the cathode moving water downwardly through the soil on both the inside and outside of the pile and reducing friction between the pile and the soil.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is an elevational and schematic view of the apparatus of the present invention as used with an electrically conductive pile which is being driven into the soil below a body of water, FIG. 2 is a cross-sectional view taken along the line 2—2 of FIG. 1, FIG. 3 is an elevational and schematic view of the apparatus of the present invention as used with a hollow electrically conductive pile which is being driven into the soil, and FIG. 4 is a cross-sectional view taken along the line 4—4 of FIG. 3.

DESCRIPTION OF THE PREFERRED EMBODIMENT

The present invention will be described in FIGS. 1 and 3 in conjunction with driving a pile 10 into the soil 12 which may be below a surface of water 14 such as an ocean. The pile 10 is being driven by any suitable type of pile driver (not shown) such as illustrated in U.S. Pat. No. 4,046,657. However, the pile may be driven by any suitable apparatus and in any direction.

The present invention is applicable to assisting in the driving of various types of conductive piles, such as steel piles, which may have various types of cross-sectional shapes, as well as having hollow or solid cross sections. The pile 10 illustrated in FIG. 1 is a typical steel H-section solid pile. When the pile 10 is driven into the soil 12, which has any significant clay content, soil is encountered having a minimum of moisture content and it becomes increasingly difficult to drive the pile 10 because of the adhesion and the shear strength of the soil 12 on the outside of the pile 10. The present invention utilizes the principle of electro-osmosis by providing an electrical current path from an anode to a cathode which will, among other things, move water along the sides of the pile 10 to decrease the adhesive strength of the soil 12 whereby the pile 10 may be more easily driven.

Referring now to FIGS. 1 and 2, the pile 10 is shown in position in contact with and being driven into the soil 12. The present invention includes any suitable dielectric coating 16, such as epoxy, on the outside of the pile 10, but the lower end 18 of the pile 10 is uncoated for providing an electrical cathode at the lower end of the pile 10. A d-c electrical power source 20 is provided above the water 14 and the negative output 22 of the power source 20 is electrically connected to the conductive pile 10 by a suitable connection 24 through an electrical conductor 26. Preferably, the electrical connection 24 is above the water 14 whereby the electrical conductor 26 need not be insulated. An anode 28 is positioned outside of the pile 10 in the water 14 and is connected to the positive output 27 of the power source through conductor 29. Obviously, the soil 14 will contain water and the anode 28 may be above or below the top surfaces of the soil 12 and still be in water for the purpose of electro-osmosis. With direct current applied between the anode 28 and the cathode 18, water adjacent the anode 28 will move downwardly through the soil 12 around the outside of the pile 10 as the pile is driven into the soil 12. The passage of the electrical current from the anode 28 to the cathode 18 reduces friction between the pile 10 and the soil 12 because (1) the increased moisture around the sides of the pile 10 decreases the soil shear strength, (2) formation of hydrogen bubbles by the passage of the electrical current increases the soil pore pressure and thus decreases soil shear strength, and (3) there is an electrical repulsion between the electrically negative cathode 18 and the naturally negative clay particles in the soil 12. The method and apparatus of FIG. 1 is particularly advantageous in that the electrical current moves from a high moisture area to a lower moisture area thereby carrying the higher moisture around the anode 28 to the lower moisture area around the outside of the pile 10. Furthermore, the apparatus does not require the extension of electrical lines to the bottom of the pile 10 which may be subject to breakage. Preferably, the width 30 of the cathode 18 is approximately equal to the width of the pile 10 and thus provides a substantial cathode area for increasing the conductivity of the electrical circuit. In addition, the magnitude of the size of the cathode 18 will generally be quite large compared to any possible defects or breaks in the insulation 16 on the pile 10 and therefore any minor defects or breaks in the insulation 16 would not unduly affect the electrical osmosis circuit.

It is to be noted that moisture is necessary to the operation of the apparatus and method. However, the pile 10 may be driven into soil 12 of a low moisture content not having a natural body of water 14 by digging a hole about the pile 10 and filling it with water.

Referring now to FIGS. 3 and 4, the use of the present apparatus and method for assisting in the driving of an electrically conductive hollow pile is shown in which the parts corresponding to those in FIGS. 1 and 2 are identical and similarly numbered with the addition of the suffix "a". The hollow steel pile 10a is provided with a dielectric coating 16a on the outside and a dielectric coating 17 on the inside but the dielectric coatings on both the inside and outside of the pile 10a at the lower end is left uncoated for providing an electrical cathode 18a at the lower end of the pile 10a. The electrically conductive pile 10a is connected by a conductor 26a to the negative terminal 22a of the d-c power source 20a thereby providing a negative potential on the cathode 18a. A first anode 28a is positioned outside of the pile 10a and in the water 14a and connected to the positive output 27a by an electrical conductor 29a. A second anode 40 is positioned inside of the hollow pile 10a and in the water 14a and electrically connected to the positive output 27a of the power souce 20a by an electrically conductor 42. With direct current applied between the anodes 28a and 40 and the cathode 18a, water on both the outside and inside of the hollow pile 10a will move downwardly through the soil 12 towards the cathode 18a along the outside and inside of the pile 10a. The use of the two anodes 28a and 40 assures that a maximum electrical current moves from an area of greater moisture to move the water towards an area of less moisture, that is, adjacent the cathode 18a. Again, the width of the cathode 18a is preferably approximately equal to the diameter of the pile 10a and therefore would normally be much larger than any minor defects or break in the insulation 16a or 17 and thus would act to continue the passage of electrical current from the anodes to the cathode 18a and thereby reduce friction between the pile and soil 12a.

The method of the present invention is apparent from the description of the foregoing apparatus and generally is directed to a method of assisting the driving of an electrically conductive pile into soil containing water by coating the outside of the pile with a dielectric coating but leaving the lower end of the pile uncoated for providing an electrical cathode at the lower end, connecting the negative output of a d-c power source to the conductive pile to provide a negative potential on the cathode, and connecting the positive output of the power source to an anode and placing the anode in the water on the outside of the pile whereby the friction between the pile and the soil is reduced by electro-osmosis allowing the pile to be more easily driven into the soil. The method further comprehends driving a hollow conductive pile into the soil in which both the inside and the outside of the pile are coated but leaving the lower ends of the pile uncoated for providing an electrical cathode, connecting the negative output of a d-c power source to the conductive pile, connecting a first anode to the positive output of the power and placing the first anode in the water outside of the pile, connecting a second anode to the positive output of the power source and placing the second anode in the water inside of the pile whereby the passage of electrical current from the anodes to the cathode move water along the inside and the outside of the pile for reducing the friction between the pile and the soil.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts and steps of the process will readily suggest themselves to those skilled in the art and which are encompassed within the spirit of the invention and the scope of the appended claims.

What is claimed is:

1. An apparatus for assisting the driving of an electrically conductive pile into soil containing water comprising,
   the outside of said pile being coated with a dielectric coating except that the lower end of the pile is uncoated for providing an electrical cathode at the lower end,
   a d-c power source, thereon
   an electrical conductor connected between the negative output of the power source and the conductive pile,
   an anode positioned outside of said pile in water, and
   a second electrical conductor connected between the anode and the positive output of the power source whereby friction between the pile and the soil is reduced.

2. The apparatus of claim 1 wherein the pile is a solid pile.

3. The apparatus of claim 1 wherein the pile is H-shaped in cross section.

4. The apparatus of claim 1 wherein the width of the uncoated pile is approximately equal to the width of the pile.

5. The apparatus of claim 1 wherein the pile is a hollow pile and includes,
   a dielectric coating on the inside of the pile except that the lower end of the inside of the pile is uncoated for providing an electrical cathode on the inside of the lower end of the pile, and a second anode positioned inside of the pile in water, and a third electrical conductor connected between the second anode and the positive output of the power source whereby friction between the inside of the pile and the soil is reduced.

6. The apparatus of claim 1 wherein the pile is circular.

7. The apparatus of claim 6 wherein the width of the cathodes is approximately equal to the diameter of the pile.

8. An apparatus for assisting the driving of an electrically conductive pile having a solid cross section into soil having water thereon comprising, a dielectric coating on the outside of said pile but the lower end of the pile being uncoated for providing an electrical cathode at the lower end, a d-c power source, an electrical conductor connected between the negative output of the power source and the conductive pile at a point above the water, an anode positioned outside of said pile in the water, and a second electrical conductor connected between the anode and the positive output of the power source whereby friction between the pile and the soil is reduced.

9. The apparatus of claim 8 wherein the width of the electrical cathode is approximately equal to the width of the pile.

10. An apparatus for assisting the driving of an electrically conductive hollow pile into soil having water therein comprising, a dielectric coating on the inside and the outside of said pile but the lower end of the pile being uncoated for providing an electrical cathode at the lower end, a d-c power source, an electrical conductor connected between the negative output of the power source and the conductive pile at a point above the water, a first anode positioned outside of said pile and in said water a second electrical conductor connected between the first anode and the positive output of the power source, a second anode positioned inside of said hollow pile and in said water, and a third electrical conductor connected between the second anode and the positive output.

11. The apparatus of claim 10 wherein the width of the cathode is approximately equal to the width of the pile.

* * * * *

UNITED STATES PATENT OFFICE
CERTIFICATE OF CORRECTION

Patent No. 4,124,483    Dated    November 7, 1978

Inventor(s)  Lowell B. Christenson

It is certified that error appears in the above-identified patent and that said Letters Patent are hereby corrected as shown below:

Column 4, line 47, after "source," delete --thereon--

Signed and Sealed this

Twenty-sixth Day of February 1980

[SEAL]

Attest:

SIDNEY A. DIAMOND

Attesting Officer    Commissioner of Patents and Trademarks